United States Patent [19]

Fujioka et al.

[11] Patent Number: 4,748,527
[45] Date of Patent: May 31, 1988

[54] MAGNETIC HEAD DEVICE WITH BACK CORE INTEGRAL IN HOLDER SHELL

[75] Inventors: Yoshiharu Fujioka, Yamato; Shoji Tsutaki, Yokohama; Mitsuo Katoh, Ayase; Hiroyuki Itou, Yokohama; Toshinobu Yoshida, Kawasaki, all of Japan

[73] Assignee: Kabushiki Kaisha Toshiba, Kawasaki, Japan

[21] Appl. No.: 791,530

[22] Filed: Oct. 25, 1985

[30] Foreign Application Priority Data

Oct. 30, 1984 [JP] Japan ............................... 59-228523
Dec. 13, 1984 [JP] Japan ............................... 59-263318
Dec. 13, 1984 [JP] Japan ............................... 59-263319

[51] Int. Cl.$^4$ .......................... G11B 5/10; G11B 5/11
[52] U.S. Cl. .................................. 360/129; 360/121; 360/126
[58] Field of Search ............................... 360/102–104, 360/126, 128–129, 118, 121, 125

[56] References Cited

U.S. PATENT DOCUMENTS 3,940,798 2/1976 Rumpler .............................. 360/127
4,084,199 4/1978 Dorreboom ........................ 360/121
4,449,155 5/1984 Meier et al. ........................ 360/104
4,518,940 5/1985 Fuchs ................................ 360/125 X Primary Examiner—Stuart N. Hecker
Assistant Examiner—David J. Severin
Attorney, Agent, or Firm—Oblon, Fisher, Spivak, McClelland & Maier

[57] ABSTRACT

A magnetic head device according to the present invention comprises a head core formed of a magnetic material. The head core includes a sliding portion having a magnetic gap defined therein and adapted to be in sliding contact with a magnetic record medium, and a pair of leg portions formed integrally with the sliding portion. A coil is wound around one of the leg portions of the head core. The head core is held between a pair of holder shells, which each have one end coupled to the sliding portion of the head core and the other end extending toward the other ends of the two leg portions of the head core to be coupled thereto. At least one of the holder shells is formed integrally with a connecting portion which, formed of a magnetic material, constitutes part of the other end of the holder shell, so that the connecting portion and the head core define a closed magnetic path passing through the magnetic gap.

10 Claims, 8 Drawing Sheets

MAGNETIC HEAD DEVICE WITH BACK CORE INTEGRAL IN HOLDER SHELL

BACKGROUND OF THE INVENTION

The present invention relates to a magnetic head device adapted for incorporation in floppy disk apparatuses, digital audio recorders, etc., and a method for manufacturing the same.

A magnetic head device of this type is disclosed in U.S. Pat. No. 4,110,804, for example. This prior art magnetic head device comprises a core formed of a magnetic material. The core includes a face, redundant rectangular in shape and having a gap for recording and reading, and a pair of legs extending parallel to each other in the same direction from either end of the face. A coil is wound around one of the legs. The legs are connected by means of a coupling member formed of a magnetic material so that a magnetic path is defined which includes the face, one leg, the coupling member, and the other leg. On either side of the core, moreover, a pair of slider plates are connected to the face portion such that they hold the face between themselves.

In assembling the conventional magnetic head device described above, it is necessary that both legs of the core be connected to the coupling member by means of an adhesive agent, and that the two slider plates be connected to the face of the core also by means of an adhesive agent. Thus, the connections between the legs of the core and the coupling member and between the core and the slider plates require two separate bonding processes, complicating bonding or assembly of the magnetic head device.

Moreover, since the core is low in mechanical strength, an increase in the number of bonding processes involving the core would tend to damage it. It is therefore impossible to reduce the width of the face of the core, that is, the thickness of that portion of the head equivalent to the track width of magnetic recording media, since the core is low in mechanical strength. Thus, the magnetic recording media cannot enjoy improved recording density.

SUMMARY OF THE INVENTION

A first object of the present invention is to provide a magnetic head device permitting of easier assembly work; free of defective workmanship, and characterized by an increased magnetic recording media, recording density. A second object of the invention is to provide a method for manufacturing the aforesaid magnetic head device.

The first embodiment of the invention is achieved by a magnetic head device, which comprises a head core formed of a magnetic material, the head core including a sliding portion having at least one magnetic gap defined therein and a head face adapted to be in sliding contact with a magnetic record medium, and a pair of leg portions each having a proximal end continuously formed integrally with the sliding portion and the other end extending away from the magnetic record medium, the pair of leg portions, along with the sliding portion, defining part of a magnetic path passing through the magnetic gap, a coil wound around one of the leg portions of the head core, and holder means for holding the head core and the coil so as to expose the head face of the head core, the holder means including a pair of holder shells formed of a nonmagnetic material and arranged so as to hold the head core therebetween, each of the holder shells having one end coupled to the sliding portion of the head core, the other end extending toward the other ends of the two leg portions of the head core to be coupled thereto, and a sliding surface adapted, along with the head face, to be in sliding contact with the magnetic record medium, and a connecting portion formed of a magnetic material and constituting part of the other end of at least one of the holder shells, so that the connecting portion and the head core define the closed magnetic path passing through the magnetic gap.

The second object of the present invention is achieved by a method for manufacturing a magnetic head device, which comprises a process for preparing the head core, a process for putting the coil on one of the leg portions of the head core, and a process for coupling the two holder shells to the head core so that the head core is sandwiched between the holder shells, at least one of the holder shells including the magnetic connecting portion.

According to the magnetic head device of the invention and the method for manufacturing the same, the holder means is formed of a pair of nonmagnetic holder shells, and the magnetic connecting portion is provided integrally with one of the holder shells. Accordingly, the magnetic head device can be formed by bonding the holder shells to the head core so that the head core is sandwiched between the holder shells and that the two leg portions of the head core are magnetically connected to each other by means of the connecting portion. Thus, the magnetic head device can be completed by a single bonding process for the head core, permitting easier assembly work and effective prevention of damage to the head core during assembly work. Accordingly, moreover, the magnetic head device can be greatly improved in productivity and reduced in cost.

Each holder shell has two ends connected individually to the sliding portion and the two leg portions. In bonding the pair of holder shells to the head core by means of an adhesive agent so that the head core is sandwiched between the holder shells, therefore, the holder shells can be pressed against the head core with a desired force without damaging the head core. Thus, it is possible to reduce the thickness of adhesive agent layers between the head core and the two holder shells without weakening the bonds between them. Moreover, the reduction of the thickness of the adhesive agent layers may improve the magnetic connections between the two leg portions of the head core and the magnetic connecting portion. It is therefore possible to stably maintain a desired density of magnetic flux flowing through the closed magnetic path which is defined by the head core and the connecting portion, passing through the magnetic gap. Thus, it is easy to ensure satisfactory characteristics of the head core.

According to a preferred embodiment of the magnetic head device of the invention, the combination of the two holder shells is in the form of a box capable of holding the head core therein. In bonding the holder shells to the head core, therefore, the two ends of each holder shell can suitably be pressed against the head core by pushing the opposite faces of the two holder shells. Thus, the two ends of each holder shell can be pressed against the head core with a uniform force, so that the thickness of the adhesive agent layers between the head core and the holder shells can be further reduced and made more uniform. Box-shaped as a whole, moreover, the magnetic head device of the invention may be improved in mechanical strength, permitting reduction in thickness and in general size.

According to another preferred embodiment of the magnetic head device of the invention, furthermore, the locating notches or grooves for mounting the device on, for example, a gimbal plate are formed on the holder shells, so that the mounting work is easy.

DETAILED DESCRIPTION OF THE PREFERRED EMBODIMENTS

Figure 1:
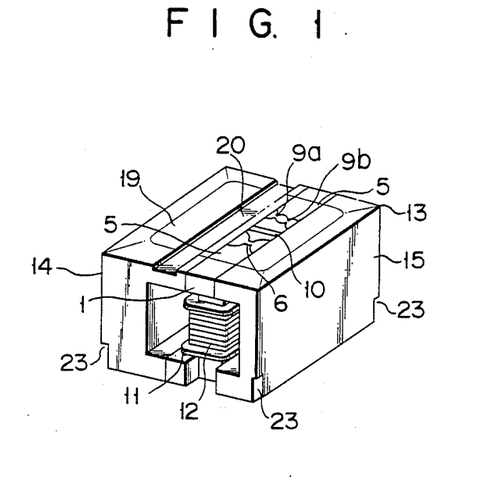
FIG. 1 is a perspective view of a magnetic head device according an embodiment of the present invention.
Figure 2:
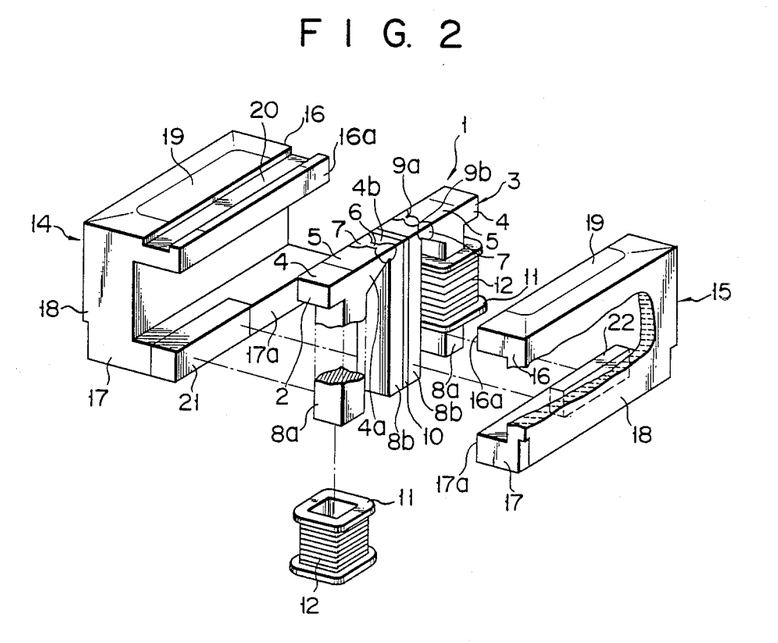
FIG. 2 is an exploded perspective view of the magnetic head device of FIG. 1.

Referring now to FIGS. 1 and 2, there is shown a magnetic head device according to the present invention. The magnetic head device comprises a head core 1 formed of a magnetic material. As best seen from FIG. 2, the head core 1 includes first and second core sections 2 and 3. The first core section 2 has an elongate sliding portion 4. The central portion of the top surface of the sliding portion 4 constitutes a head face 5 which is adapted to be in sliding contact with a magnetic recording surface of a magnetic recording medium, e.g., a floppy disk (not shown). The head face 5 is formed with a gap 6 for recording and reading on the magnetic recording medium. The gap 6 is formed by assembling the sliding portion 4 from first and second half bodies 4a and 4b and then bonding them together by means of a glass material 7.

A pair of leg portions 8a and 8b are formed integrally on the undersurface of the sliding portion 4, extending parallel to each other on the opposite side thereof to the magnetic recording medium side. The one leg portion 8a is located at a certain distance from one end of the sliding section 4, while the other leg portion 8b overlaps the other end of the sliding portion 4.

The second core section 3 differs from the first core section 2 in that it is formed with gaps 9a and 9b for erasure in place of the recording/reading gap 6. Therefore, like reference numerals are used to designate like or similar portions of the first and second core sections 2 and 3, and a description of the second core section 3 is omitted.

As shown in FIG. 2, the first and second core sections 2 and 3 are coupled integrally by bonding their respective other leg portions 8b by means of a non-magnetic adhesive agent 10 so that their head faces 5 are situated flush with each other. Thus, the whole head core 1 is completed.

A coil 12 wound around a bobbin 11 is fitted on each of the respective one leg portions 8a of the first and second core sections 2 and 3. The coils 12 are connected to an electric circuit (not shown).

The head core 1 fitted with the coils 12 in the aforesaid manner is contained in a box-shaped head holder 13 so that the head faces 5 are exposed, as shown in FIG. 1. The head holder 13 comprises first and second holder shells 14 and 15 made of a nonmagnetic material such as ceramics. The first holder shell 14 includes an upper plate portion 16 extending in the same direction as the sliding portions 4 of the head core 1 and having one side wall 16a thereof bonded to the sliding portions 4, a lower plate portion 17 extending parallel to and at a predetermined space from the upper plate portion 16 and having one side wall 17a thereof bonded to the ends of the leg portions 8 of the head core 1, and a coupling plate portion 18 extending parallel to the leg portions 8 of the head core 1 so as to connect the respective other side edges of the upper and lower plate portions 16 and 17. A sliding surface 19 is formed in the center of the top surface of the upper plate portion 16. The sliding surface 19, along with the head faces 5 of the head core 1, is adapted to be in sliding contact with the recording surface of the magnetic recording medium. In this arrangement, the peripheral edge portion of the top surface of the upper plate portion 16 is tapered, and the boundary line between the tapered edge portion and the sliding surface 19 is rounded. Also, a groove 20 extending parallel to the sliding portions 4 of the head core 1 is formed on the top surface of the upper plate portion 16, located close to the sliding portions 4.

A connecting portion 21 formed of a magnetic material is embedded in the one side wall 17a of the lower plate portion 17 of the first holder shell 14. The connecting portion 21 is located in a position corresponding to the leg portions 8a and 8b of the first core section 2, and has a length equivalent to the distance between the two leg portions 8a and 8b. When the first holder shell 14 is attached to one side of the head core 1, therefore, the connecting portion 21 magnetically connects the two leg portions 8a and 8b of the first core section 2. Thus, a closed magnetic path including the first half body 4a, leg portion 8a, connecting portion 21, leg portion 8b, second half body 4b, and gap 6 is defined in the first core section 2.

The second holder shell 15 has a shape similar to that of the first holder shell 14. Like reference numerals are used to designate like portions of the first and second holder shells 14 and 15, and a description of those like portions of the second holder shell 15 is omitted. The following are points of difference between the first and second holder shells 14 and 15. First, as seen from FIG. 2, the second holder shell 15 is not formed with the groove 20 on its top surface. As in the first holder shell 14, a connecting portion 22 formed of a magnetic material is embedded in the one side wall 17a of the lower plate portion 17 of the second holder shell 15. The connecting portion 22 is located in a position corresponding to the leg portions 8a and 8b of the second core section 3, and has a length equivalent to the distance between the two leg portions 8a and 8b. When the second holder shell 15 is attached to the other side of the head core 1, therefore, the connecting portion 22 magnetically connects the two leg portions 8a and 8b of the second core section 3. Thus, a closed magnetic path including the first half body 4a, leg portion 8a, connecting portion 22, leg portion 8b, second half body 4b, and gaps 9a and 9b is defined in the second core section 3, as in the first core section 2.

Figure 3:
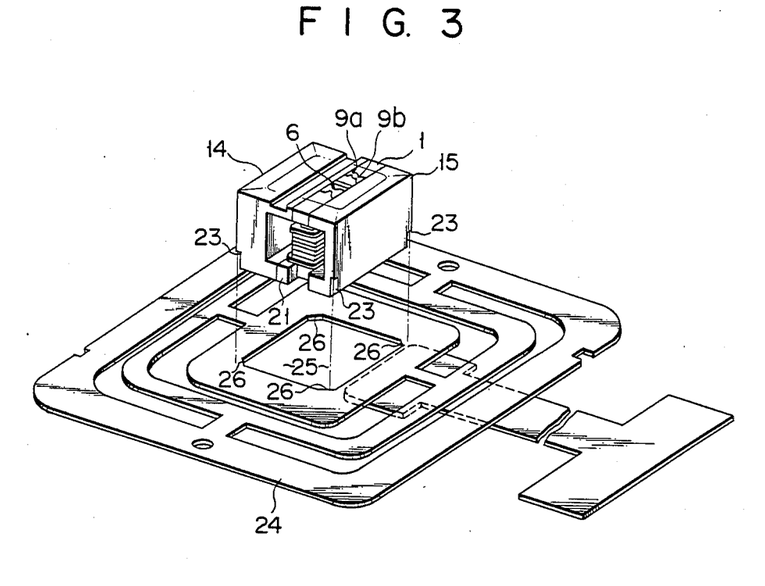
FIG. 3 is a perspective view illustrating the way the magnetic head device of FIG. 1 is mounted on a gimbal plate.

Moreover, notches 23, as shown in FIG. 1, are formed individually at the lower four corners of the head holder 13 consisting of the first and second holder shells 14 and 15. As shown in FIG. 3, the notches 23 serve both as mounting portions whereby the magnetic head device is mounted on a gimbal plate 24 and as positioning means for the gimbal plate 24. The gimbal plate 24 is formed with a rectangular fitting hole 25 for setting the magnetic head device in place. Support pieces 26 to engage the notches 23 of the magnetic head device are formed individually at the four corners of the fitting hole 25. The gimbal plate 24 is coupled to a carriage (not shown), which is driven by an access mechanism (not shown).

Referring now to FIG. 2, assembling of the magnetic head device will be described.

First, the bobbins 11 wound with the coil 12 are fitted and fixed on their corresponding leg portions 8a of the head core 1. Thereafter, the first and second holder shells 14 and 15 are placed on either side of the head core 1, and then bonded to the head core 1 by means of an adhesive agent so as to hold the same between them. At the same time, the holder shells 14 and 15 are pressed against the head core 1 with a predetermined force so that they are joined together into an integral structure. Thus, the assembling of the magnetic head device is completed.

The present invention is not limited to the magnetic head device according to the embodiment described above. Several modifications of the magnetic head device will now be described.

Figure 4:
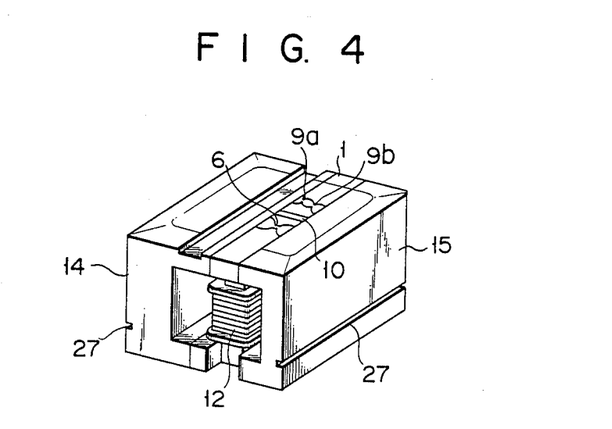
FIG. 4 is a perspective view showing a modification of the magnetic head device.
Figure 5:
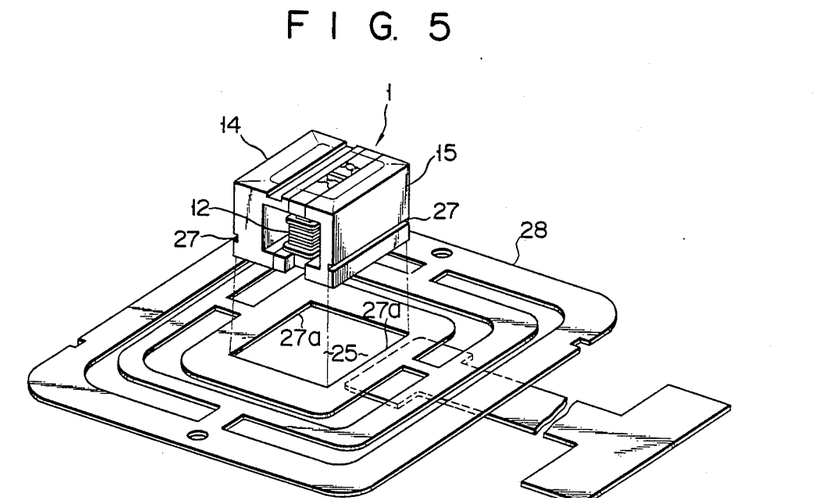
FIG. 5 is a perspective view illustrating the way the magnetic head device of FIG. 4 is mounted on the gimbal plate.

A magnetic head device shown in FIG. 4 differs from the device of FIG. 1 in that it is provided with a pair of fitting grooves 27 in place of the notches 23. The fitting grooves 27 are formed individually at the lower end portions of the respective coupling plate portions 18 of the first and second holder shells 14 and 15, extending along the sliding portions 4 of the head core 1. Like the one shown in FIG. 1, the magnetic head device of FIG. 4 constructed in this manner may be mounted on a gimbal plate 28 as shown in FIG. 5. In this case, the magnetic head device is attached to the gimbal plate 28 by fitting two opposite inner side edges 27a of the fitting hole 25 of the gimbal plate 28 into their corresponding fitting grooves 27 of the magnetic head device. Since the gimbal plate 28 is so flexible that the inner side edges 27a can easily be fitted into the fitting grooves 27.

Figure 6:
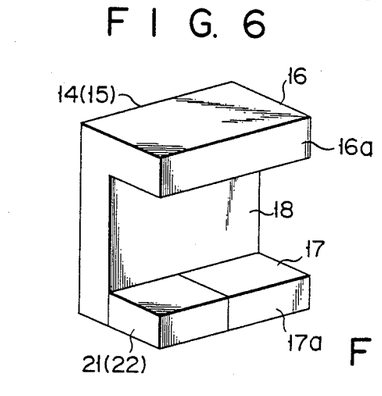
FIGS. 6 to 8 are perspective views showing modifications of a holder shell.
Figure 7:
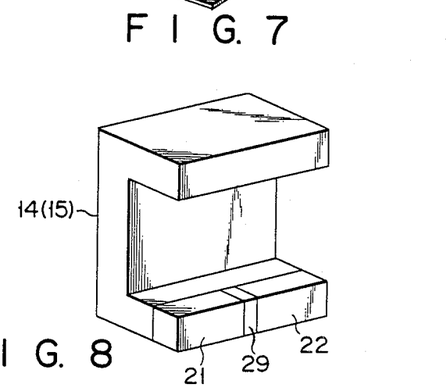
Figure 8:
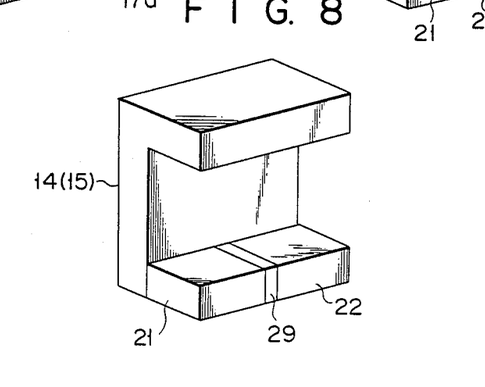

FIGS. 6 to 8 show modified examples of the holder shell. In the holder shell 14 (15) of FIG. 6, the connecting portion 21 (22) covers substantially half the area of the lower plate portion 17. The holder shell 14 (15) of FIG. 7 has both of the connecting portions 21 and 22. With use of such a holder shell 14 (15), the other holder shell 15 (14) need not be provided with any connecting portion. In the holder shell 14 (15) of FIG. 8, which is obtained by combining the holder shells of FIGS. 6 and 7, an insulating layer 29 of a non-magnetic material is sandwiched between the connecting portions 21 and 22, whereby the connecting portions 21 and 22 are magnetically insulated. It is to be understood that the closed magnetic paths passing through the gaps can be defined in the first and second core sections 2 and 3 also with use of the holder shells 14 (15) of FIGS. 6 to 8. In FIGS. 6 to 8, the holder shells 14 (15) are shown only schematically.

Referring now to FIGS. 9 to 13, processes for manufacturing the holder shell 14 (15) used in the magnetic head device of FIG. 1 will be described in detail.

Figure 9:
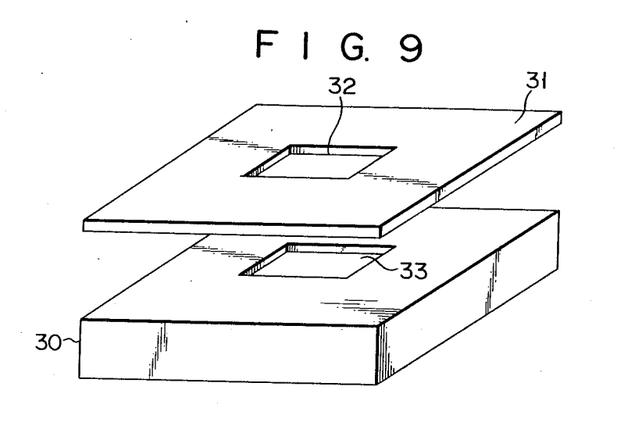
FIGS. 9 to 13 are schematic views for illustrating a method for manufacturing the holder shell shown in FIG. 1.
Figure 10:
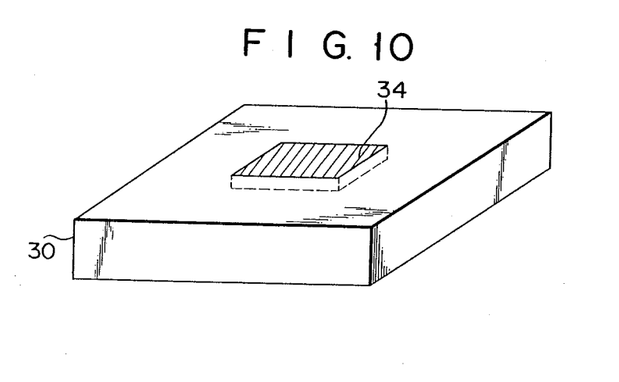
Figure 11:
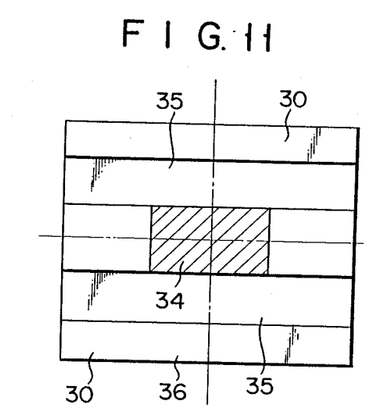
Figure 12:
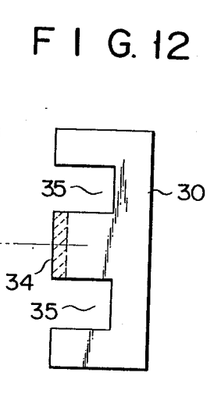
Figure 13:
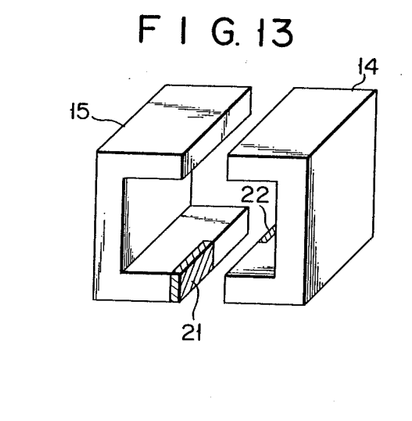

First, a rectangular plate 30 formed of a non-magnetic material such as ceramics is prepared as shown in FIG. 9. Then, a mask plate 31 with a rectangular opening 32 in the center is placed on one side of the plate 30. Thereafter, that surface portion of the plate 30 exposed through the opening 32 of the mask plate 31 is etched to form a depression 33 on the top surface of the plate 30, as shown in FIG. 9. Then, a magnetic material such as permalloy is deposited in the depression 33 of the plate 30 by plating, sputtering or vapor deposition. As a result, a magnetic body 34 is embedded in the top surface of the plate 30, as indicated by hatching in FIG. 10. Thereafter, a pair of grooves 35 are formed on the top surface of the plate 30 so as to extend parallel to each other on either side of the magnetic body 34, as shown in FIG. 11. In forming the grooves 35 in this manner, part of the plate 30 may be left between each groove 35 and the magnetic body 34. Thereafter, the top surfaces of the plate 30 and the magnetic body 34 are specularly ground to form a bonding surface 36 which is to be bonded to the head core 1. Four holder shells 14 as shown in FIG. 13 are formed by cutting the plate 30 with the magnetic body 34 thereon into quarters along the broken lines of FIGS. 11 and 12. In FIG. 13, only two of the four holder shells 14 are shown, and an illustration of the sliding surface 19, groove 20, and notches 23 is omitted. The other holder shell 15 may be manufactured by the same method as the holder shell 14 described above.

Figure 14:
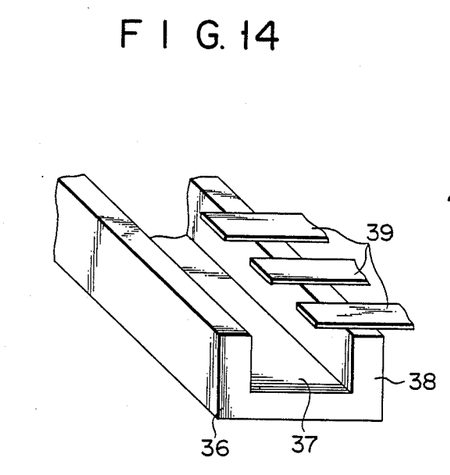
FIGS. 14 to 18 are schematic views for illustrating an alternative method for manufacturing the holder shell of FIG. 1.
Figure 15:
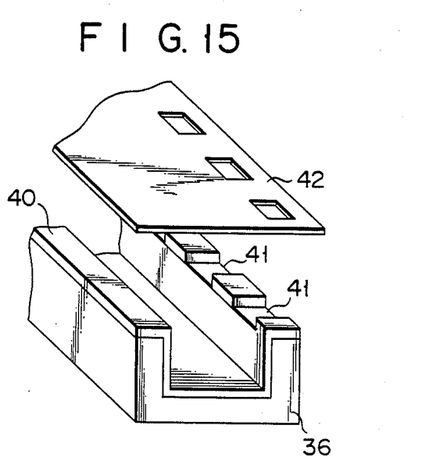
Figure 16:
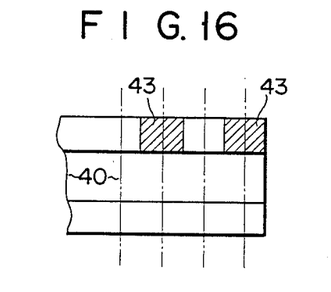
Figure 17:
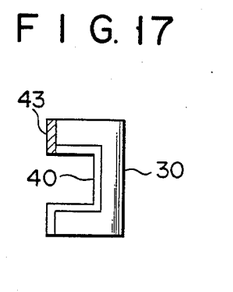
Figure 18:
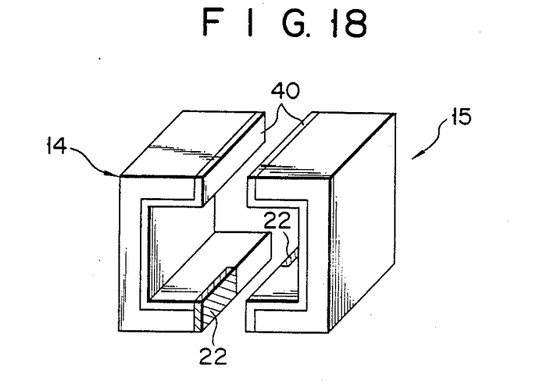

Referring now to FIGS. 14 to 18, there are shown alternative processes for manufacturing the holder shells 14 used in the magnetic head device of FIG. 1. In the description of the method to follow, only those processes for the principal parts of the holder shells 14 will be mentioned. First, as shown in FIG. 14, a groove 37 is formed on one side of an elongate square bar 36 made of a nonmagnetic material so as to extend in the longitudinal direction of the square bar 36. Then, after a number of first masks 39 are arranged at regular intervals in the longitudinal direction of the square bar 36 on the top surface of one side wall 38 of the square bar 36, a nonmagnetic material, such as glass, is deposited on the whole upper surface of the square bar 36 including the groove 37 to form a nonmagnetic layer 40, as shown in FIG. 15. As a result, a number of depressions 41 or those regions not covered with the nonmagnetic layer 40 are formed at regular intervals in the longitudinal direction of the square bar 36 on the top surface of the side wall 38 of the square cover 36. Thereafter, a second mask 42 having openings corresponding in shape and position to the depressions 41 are placed on the nonmagnetic layer 40, and a magnetic material, such as permalloy, is deposited on the depressions 4 exposed through the openings of the second mask 42. Thus, a number of magnetic bodies 43 are arranged at regular intervals in the longitudinal direction of the square bar 36 on the top surface of the side wall 38 of the square bar 36, as shown in FIG. 16. The magnetic bodies 43 are indicated by hatching in FIG. 16. Thereafter, a number of holder shells 14, as shown in FIG. 18, are formed by cutting the square bar 36 at those positions indicated by broken lines in FIG. 16, i.e., broken lines passing through the respective centers of the magnetic bodies 43 and those passing through the middle points between the magnetic bodies 43. The other holder shell 15 may be formed in the same method as the holder shell 14 described above.

Figure 19:
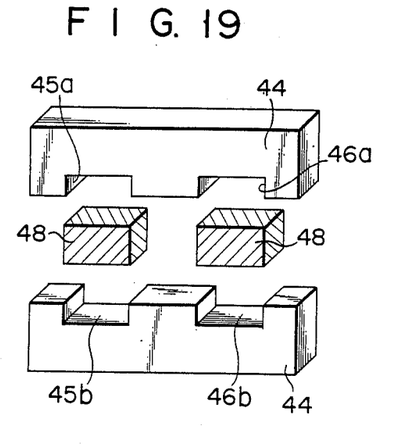
FIGS. 19 to 23 are schematic views for illustrating a method for manufacturing the holder shell shown in FIG. 6.
Figure 20:
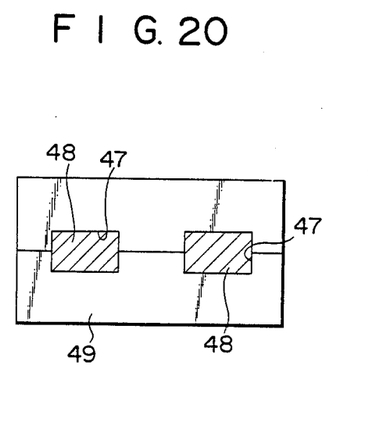
Figures 21, 22:
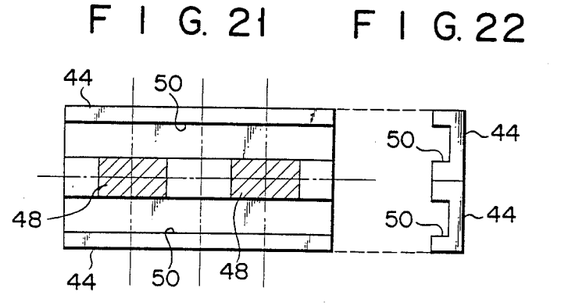
Figure 23:
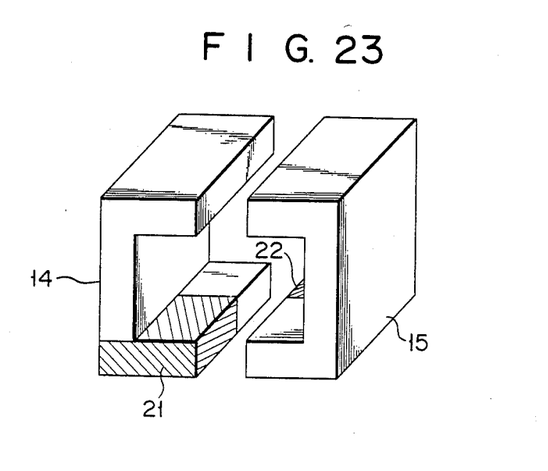

Referring now to FIGS. 19 to 23, there are shown processes for manufacturing the holder shell 14 (15) of FIG. 6. First, as shown in FIG. 19, a pair of square bars 44 made of a nonmagnetic material, such as ceramics, are prepared, and two pairs of depressions 45a, 46b and 46a, 46b are formed on the opposed side faces of the square bars 44. Then, as shown in FIG. 20, the square bars 44 are bonded to each other so that magnetic bodies 48 (indicated by hatching) are fitted individually in a pair of apertures 47 which are defined by the combinations of the depressions 45a and 45b and the depressions 46a and 46b when the two square bars 44 are joined together. Thereafter, the surfaces 49 of the square bars 44 shown in FIG. 20 are specularly ground, and a pair of parallel grooves 50 are formed on the surfaces 49 of the square bars 44 on either side of the magnetic bodies 47, as shown in FIGS. 21 and 22. Then, six holder shells 14 (15) can be obtained by cutting the square bars 44 with the grooves 50 thereon along the dashed lines of FIGS. 20 and 22. Only two of the six holder shells 14 (15) are shown in FIG. 23.

Figure 24:
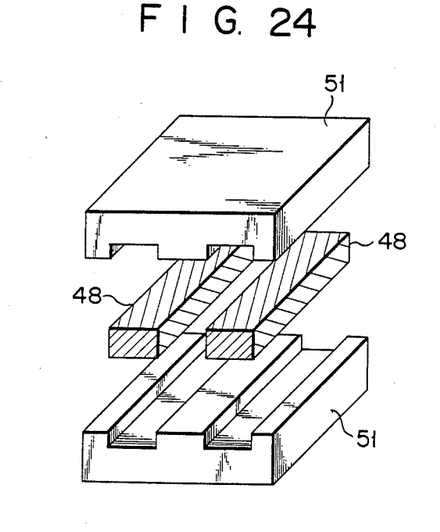
FIGS. 24 and 25 are schematic views for illustrating an alternative method for manufacturing the holder shell of FIG. 6.
Figure 25:
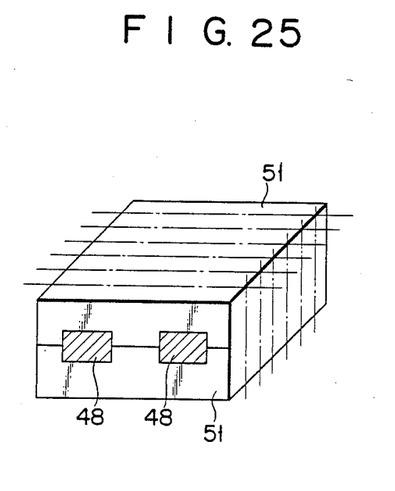

Referring now to FIGS. 24 and 25, there are shown alternative processes for manufacturing the holder shell 14 (15) of FIG. 6. The manufacturing processes shown in FIGS. 24 and 25 differ from the aforementioned processes in that plates 51 formed of a nonmagnetic material are used in place of the square bars 44. According to these alternative processes, like members as shown in FIG. 20 can be obtained by cutting the plates 51 with two magnetic bodies 48 thereon along the dashed lines of FIG. 25. Thereafter, the holder shells 14 (15) can be completed in the same manner as aforesaid.

Figure 26:
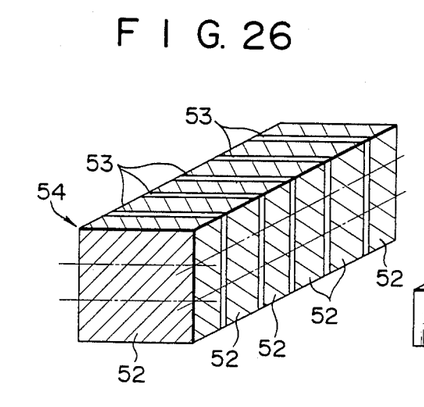
FIGS. 26 to 31 are schematic views for illustrating methods for manufacturing the holder shells shown in FIGS. 7 and 8.
Figure 27:
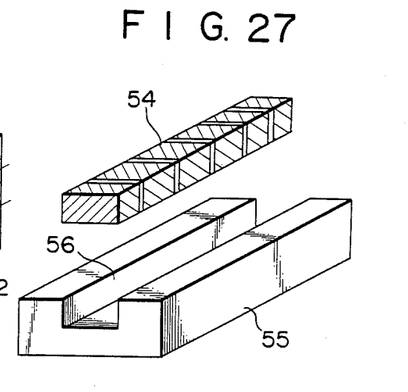
Figure 28:
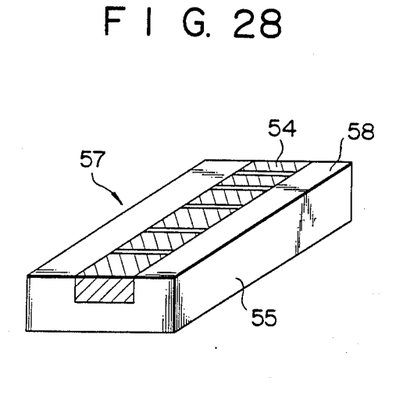
Figure 29:
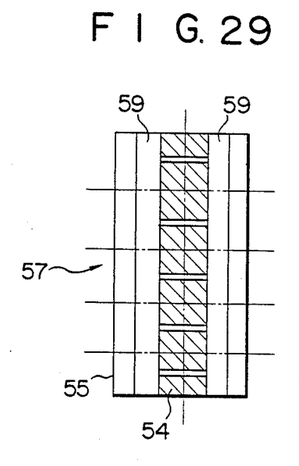
Figure 30:
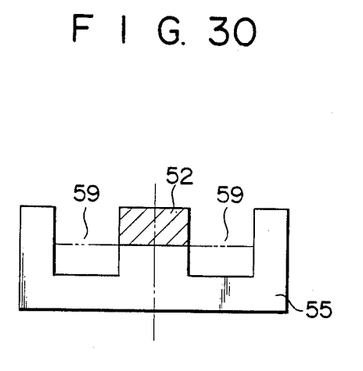
Figure 31:
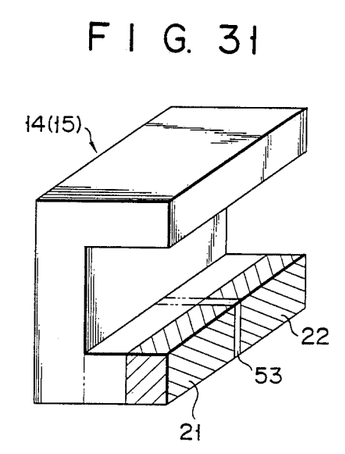

Referring now to FIGS. 26 to 31, there are shown processes for manufacturing the holder shells 14 (15) of FIGS. 7 and 8. First, a square bar 54 is prepared which is formed by alternately arranging magnetic bodies 52 and nonmagnetic bodies 53 in layers and bonding them together as shown in FIG. 26. Then, as shown in FIG. 28, the square bar 54 is fitted in a groove 56 in a square bar 55 made of a nonmagnetic material as shown in FIG. 27, to form a block 57. Thereafter, a surface 58 of the block 57 shown in FIG. 28 is specularly ground, and a pair of parallel grooves 59 are then formed on the surface 58 on either side of the square bar 54, as shown in FIGS. 29 and 30. Then, the holder shell 14 (15) of FIG. 7 can be obtained by cutting the block 57 with the grooves 59 thereon along the dashed lines of FIG. 29.

The holder shell 14 (15) of FIG. 8 can be obtained by the same manufacturing processes as aforesaid, except that the depth of the grooves 59 is made equal to the thickness of the square bar 54, as indicated by a two-dot chain line in FIG. 30.

What is claimed is:

1. A magnetic head device for magnetically recording data on and reading the recorded data from a magnetic recording medium; comprising:

a core formed of a magnetic material, said core including a sliding portion having at least one magnetic gap defined therein and a face adapted to be in sliding contact with the magnetic recording medium, and a pair of legs each having a proximal end coupled integrally with the sliding portion and a distal end extending away from the magnetic recording medium, the pair of legs, along with the sliding portion, defining part of a magnetic path passing through the magnetic gap;

a coil wound around one of the legs of the core; and holder means for holding said core and said coil so that said face may contact the magnetic recording medium;

said holder means including a pair of holder shells formed of a nonmagnetic material and arranged so as to hold said core therebetween, each holder shell having one end coupled to the sliding portion of said core, another end extending toward and coupled with the distal ends of the two legs of said core, and a sliding surface provided at part of the holder shell and adapted, along with the face, to be in sliding contact with the magnetic recording medium; and a connecting portion formed of a magnetic material and constituting part of the leg coupling end of at least one of the holder shells so that the connecting portion and said core define a closed magnetic path passing through the magnetic gap said connecting portion being integrally formed with said holder means.

2. The magnetic head device according to claim 1 wherein each holder shell includes a pair of parallel plates parallel to each other and a perpendicular plate perpendicular to the parallel plate portions and coupling one end of the parallel plates together, the other end of one of the parallel plates being connected to the sliding portion of said core, and a connecting portion formed of a magnetic material being attached to the other end of the other parallel plate, whereby the two legs of said core are magnetically connected.

3. The magnetic head device according to claim 2, wherein each holder shell further includes notches for mounting said magnetic head device, the notches being provided at the outer corners of the perpendicular plate portion.

4. The magnetic head device according to claim 2, wherein each holder shell further includes a groove for mounting said magnetic head device, the groove being provided at the outer surface of the perpendicular plate portion and extended parallel to the sliding portion.

5. The magnetic head device according to claim 2, wherein one of holder shells further includes a groove, the groove being provided at the sliding surface and extended parallel to the sliding portion.

6. The magnetic head device according to claim 1, wherein the sliding portion of said core includes a first half section and a second half section, magnetically insulated from each other, the first half section having the magnetic gap defined therein and being coupled integrally with the two legs, and the second half section having the second magnetic gaps defined therein, defining part of a magnetic path passing through the second magnetic gaps, and being coupled integrally with a pair of second legs, one of which is wound with a coil; and at least one of the holder shells includes a second connecting portion formed of a magnetic material, the second connecting portion constituting part of said another end of the holder shell and magnetically connecting the two second leg portions.

7. The magnetic head device according to claim 6, wherein the first connecting portion magnetically connecting the leg portions of the first half section is provided at said another end of the one holder shell, and the second connecting portion magnetically connecting the second leg portions of the second half section is provided at said another end of another of said pair of holder shells.

8. The magnetic head device according to claim 7, wherein the first and second connecting portions extend from the other end to a perpendicular plate portion of each corresponding holder shell.

9. The magnetic head device according to claim 6, wherein the first connecting portion magnetically connecting the leg portions of the first half section and the second connecting portion magnetically connecting the second leg portions of the second half section are provided at the other end of the one holder shell, a magnetic insulating member being interposed between the first and second connecting portions.

10. The magnetic head device according to claim 9, wherein the first and second connecting portions extend from the other end to a perpendicular plate portion of the holder shell.

* * * * *